United States Patent
Lee et al.

(10) Patent No.: US 10,734,935 B2
(45) Date of Patent: Aug. 4, 2020

(54) QUASI SIX-STEP PWM CONTROL

(71) Applicant: GM Global Technology Operations LLC, Detroit, MI (US)

(72) Inventors: Young Joo Lee, Rochester, MI (US); Sangyeop Kwak, Orion Charter Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 374 days.

(21) Appl. No.: 15/712,223

(22) Filed: Sep. 22, 2017

(65) Prior Publication Data

US 2019/0097562 A1    Mar. 28, 2019

(51) Int. Cl.
*H02P 27/08* (2006.01)
*B60L 50/51* (2019.01)

(52) U.S. Cl.
CPC .............. *H02P 27/08* (2013.01); *B60L 50/51* (2019.02); *H02P 27/085* (2013.01); *B60L 2210/42* (2013.01)

(58) Field of Classification Search
None
See application file for complete search history.

(56) References Cited

U.S. PATENT DOCUMENTS

| | | | |
|---|---|---|---|
| 5,736,825 A | 4/1998 | Kaura et al. | |
| 6,777,897 B2 | 8/2004 | Murai | |
| 9,419,549 B2 * | 8/2016 | Yim | H02P 27/08 |
| 2010/0127656 A1 * | 5/2010 | Ohtani | H02M 7/53875 |
| | | | 318/811 |
| 2014/0117893 A1 * | 5/2014 | Omata | H02P 21/14 |
| | | | 318/400.02 |
| 2014/0125264 A1 * | 5/2014 | Nakamura | H02P 6/10 |
| | | | 318/400.23 |
| 2016/0141983 A1 | 5/2016 | Yim et al. | |
| 2017/0361732 A1 * | 12/2017 | Grubic | B60L 15/02 |

FOREIGN PATENT DOCUMENTS

| | | |
|---|---|---|
| DE | 102007040560 A1 | 3/2009 |
| EP | 1511169 A2 | 3/2005 |

OTHER PUBLICATIONS

Joachim Holtz, On Continuous Control of PWM Inverters in the Overmodulation Range including the Six-Step Mode, 1993, IEEE, pp. 546-553 (Year: 1993).*

* cited by examiner

*Primary Examiner* — Bickey Dhakal
(74) *Attorney, Agent, or Firm* — Quinn IP Law

(57) ABSTRACT

A method is provided for controlling a transition between over-modulation and six-step pulse width modulation (PWM) modes in an electrical system having a polyphase electric machine driven by a polyphase output voltage of a power inverter. The method includes receiving input values via a PWM controller, including a holding angle, rotational speed of the electric machine, and present voltage angle of the power inverter. The method includes calculating a future voltage angle of the inverter using the input values and adjusting pulse widths of a baseline PWM pulse train based on a duty cycle of the power inverter. The power inverter output voltage is controlled during the transition using the adjusted baseline PWM pulse train, such that the transition is continuous. An electrical system includes the power supply, power inverter, electric machine, and the PWM controller, the latter of which is configured to execute the method.

18 Claims, 8 Drawing Sheets

QUASI SIX-STEP PWM CONTROL

INTRODUCTION

Motors, generators, and other types of electric machines are often embodied as alternating current (AC) torque-generating devices. When the electric machine is energized by a direct current (DC) voltage from a multi-cell battery pack or other DC power supply, a power inverter produces a desired polyphase AC output voltage. For example, a three-phase AC power inverter uses three separate phase inverters each having semiconductor switching components, e.g., IGBTs, MOSFETs, or thyristors. The on/off states of the switching components for a given electrical phase are controlled to produce the desired AC output voltage. The AC output voltage is thereafter supplied to a corresponding phase winding of the electric machine.

Pulse-width modulation (PWM) is a technique for adjusting a level of power delivered to a connected electrical load. PWM involves the digital encoding of an analog reference signal corresponding to the desired AC output voltage. In a typical PWM process, a modulator adjusts the pulse widths of a series of digital pulses in proportion to the magnitude of the analog reference signal. As a result, the AC output voltage of the power inverter varies between 0% and 100% of the available DC input voltage by adjusting the duty cycle of the DC power supply.

SUMMARY

A method and associated system are disclosed herein for smoothing a mode transition between an over-modulation mode and six-step pulse-width modulation (PWM) mode in a system having an electric machine. The electric machine is electrically driven by a polyphase voltage from a power inverter. The method is intended to optimize the overall efficiency and smoothness of the noted mode transition, particularly during high-speed operation of the electric machine.

As used herein, the term "six-step PWM" refers to a switching control mode in which the power inverter cycles through six non-zero voltage states for each cycle of the electric machine. The voltage angles of the six non-zero voltage states are spaced apart from each other by 60 degrees of phase shift. Within the overall context of PWM control, the term "modulation index" refers to the ratio of an amplitude of a modulated waveform to an amplitude of a carrier waveform, e.g., a triangle pulse wave. A linear relationship exists between the input to the power inverter and the output voltage when 0<MI<1, with "MI" representing the modulation index. Also as used herein, "over-modulation" is a mode that occurs when the modulation index exceeds 1, and is often handled by introducing a calibrated harmonic signal. A transition between over-modulation mode and six-step PWM mode, particularly during higher rotational speeds of the electric machine, may result in undesirable current ripple and/or potential over-current faults. Operation within the transition range according to the present method is referred to herein as "quasi six-step PWM". Execution of the method shapes the duty cycle of DC power to a power inverter such that an intended voltage angle matches its ideal angle, thereby smoothing the transition.

According to an example embodiment, the method may include receiving input values via a PWM controller, including a holding angle, a rotational speed of the electric machine, and a present voltage angle of the power inverter. The method also includes calculating, via the PWM controller, a future voltage angle of the power inverter using the received input values, and identifying an uphill or downhill PWM profile from the future voltage angle. Thereafter, the method includes determining a zone of operation within the identified uphill or downhill PWM profile as a present operating region of the power inverter, and then adjusting pulse widths of a baseline PWM pulse train from the controller based on the determined uphill or downhill zone of operation. The method may further include controlling the output voltage of the power inverter during the transition using the adjusted baseline PWM pulse train such that the transition is continuous.

The output voltage of the power inverter may be controlled during the transition according to the disclosed method when a modulation index is between 98 percent and 100 percent.

The electric machine may be embodied as a three-phase traction motor. In such an embodiment, controlling the output voltage of the power inverter may include outputting a three-phase AC output voltage from the power inverter to phase windings of the electric traction motor.

The PWM controller may adjust pulse widths of a baseline PWM pulse train based on a duty cycle of the power inverter. For example, the PWM controller may identify an uphill or downhill PWM profile, with the uphill and downhill profiles respectively corresponding to an increasing and decreasing duty cycle of the power inverter. The method may then include determining a zone of operation on the identified uphill or downhill PWM profile as a present operating region of the power inverter, and adjusting the pulse widths based on the increasing or decreasing duty cycle.

Determining the zone of operation on the identified uphill PWM profile may determining whether the duty cycle is: 0 percent at the present voltage angle and less than 100 percent at the future voltage angle, corresponding to a first uphill zone of operation; greater than 0 percent at the present voltage angle and less than 100 percent at the future voltage angle, corresponding to a second uphill zone of operation; greater than 0 percent at the present voltage angle and 100 percent at the future voltage angle, corresponding to a third uphill zone of operation; or 0 percent at the present voltage angle and 100 percent at the future voltage angle, corresponding to a fourth uphill zone of operation.

Similarly, determining the zone of operation on the identified downhill PWM profile may include determining whether the duty cycle is: 100 percent at the present voltage angle and more than 0 percent at the future voltage angle, corresponding to a first downhill zone of operation; less than 100 percent at the present voltage angle and greater than 0 percent at the future voltage angle, corresponding to a second downhill zone of operation; less than 100 percent at the present voltage angle and 0 percent at the future voltage angle, corresponding to a third downhill zone of operation; or 100 percent at the present voltage angle and 0 percent at the future voltage angle, corresponding to a fourth downhill zone of operation.

Adjusting pulse widths of a baseline PWM pulse train may include modifying a baseline PWM pulse train configured for use in the six-step PWM mode. Such modifying of the baseline PWM pulse train may include progressively widening (uphill) or narrowing (downhill) pulses of the baseline PWM pulse between the present voltage angle and the future voltage angle during the uphill and downhill PWM profiles, respectively. For the uphill PWM profile, modification may include introducing an initial step to a low threshold duty cycle upon commencing the uphill PWM profile, and then ramping the duty cycle from a level of the low threshold duty cycle to 100 percent duty cycle.

An electrical system includes the DC power supply, power inverter, electric machine, and PWM controller. In an embodiment, the PWM controller receives input values, including a holding angle, a rotational speed of the electric machine, and a present voltage angle of the power inverter, and calculates a future voltage angle of the power inverter using the received input values. The PWM controller is configured to adjust pulse widths of a baseline PWM pulse train from the PWM controller based on a duty cycle of the power inverter, and to control the output voltage of the power inverter during the transition using the adjusted baseline PWM pulse train such that the transition is continuous.

The above-noted and other features and advantages of the present disclosure, will be readily apparent from the following detailed description of the embodiment(s) and best mode(s) for carrying out the described disclosure when taken in connection with the accompanying drawings and appended claims.

Figure 1:
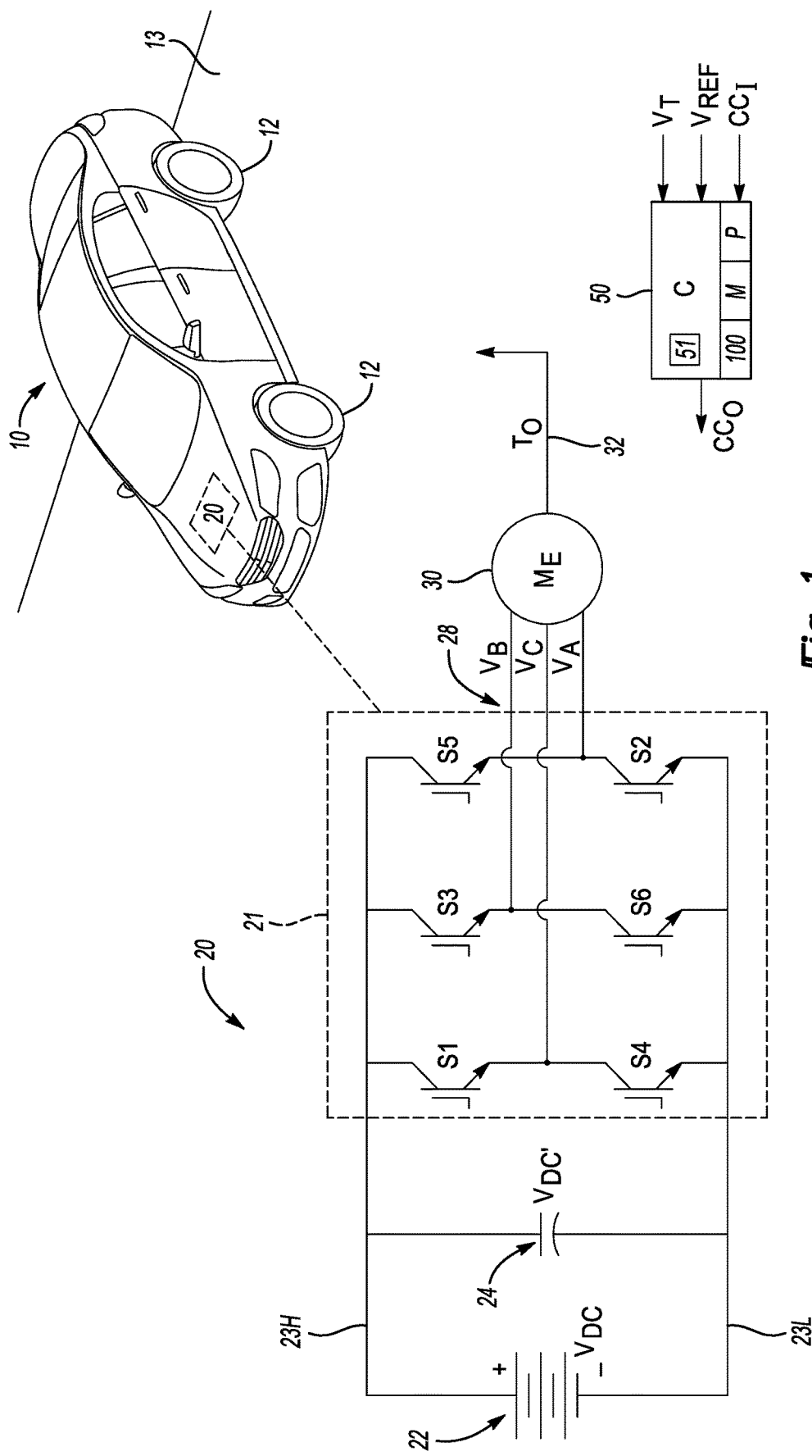
FIG. 1 is a schematic illustration of an example vehicle having an electric machine and a pulse-width modulation (PWM) controller configured to perform a quasi six-step PWM control technique for control of the electric machine as set forth herein.

The present disclosure is susceptible to various modifications and alternative forms, and some representative embodiments have been shown by way of example in the drawings and will be described in detail herein. Novel aspects of this disclosure are not limited to the particular forms illustrated in the drawings. Rather, the disclosure is intended to cover modifications, equivalents, combinations, or alternatives falling within the spirit and scope of the disclosure as defined by the appended claims.

DETAILED DESCRIPTION

Referring to the drawings, wherein like reference numbers refer to like components throughout the several views, a system is shown schematically in FIG. 1 as an example motor vehicle 10 having wheels 12 in rolling frictional contact with a road surface 13. The vehicle 10 includes an electrical system 20 whose operation is automatically controlled via a pulse-width modulation (PWM) controller (C) 50 as set forth herein. While the electrical system 20 and the PWM controller 50 may be used as part of an example powertrain of the vehicle 10, those of ordinary skill in the art will appreciate that the electrical system 20 may be used with other types of systems, including mobile as well as stationary systems, and thus the present disclosure is not limited to use in vehicles in general or the motor vehicle 10 of FIG. 1 in particular.

As will be described in detail below with reference to FIGS. 2-6D, the controller 50 is configured to control operation of an electric machine ($M_E$) 30 via the process of pulse width modulation (PWM), doing so according to a method 100. In particular, the PWM controller 50 regulates a mode transition between an over-modulation mode and a six-step PWM mode as described briefly above, with the disclosed transitional approach referred to herein as "quasi six-step PWM". Absent the method 100, mode transitions between over-modulation and six-step PWM may be perceptible to a user of the particular system within which the electrical system 20 is used, with the suboptimal transition manifesting as noise, vibration, and harshness or a torque discontinuity at relatively high rotational speeds of the electric machine 30, e.g., when the vehicle 10 is cruising at highways speeds. Mode transitions may also result in undesirable current ripple and/or an over-current fault. Execution of the method 100 is therefore intended to optimally smooth the mode transition between over-modulation and six-step PWM so that the mode transition is largely imperceptible, e.g., to a driver of the vehicle 10.

The PWM controller 50, which is shown as a single control device in FIG. 1 for illustrative clarity, may be embodied as multiple networked devices, including a PWM modulator circuit 51 operable for modulating a periodic carrier wave ($V_T$), e.g., a triangle waveform. This is achieved using a phase-specific reference voltage signal ($V_{REF}$), such as phase-shifted A, B, and C-phase sinusoidal reference waveforms in an example three-phase embodiment. As part of the method 100, the controller 50 receives input values (arrow $CC_I$) and ultimately generates output signals (arrow $CC_O$) to control operation of a power inverter 21 and the connected electric machine 30.

The PWM controller 50 is equipped with sufficient hardware to perform the required logical and control processes of the method 100, i.e., sufficient memory (M), a processor (P), and other hardware not shown for simplicity, such as a high-speed clock, analog-to-digital and/or digital-to-analog circuitry, a timer, input/output circuitry and associated devices, signal conditioning and/or signal buffering circuitry. The memory (M) includes sufficient tangible, non-transitory memory such as magnetic or optical read-only memory, flash memory, etc., as well as random access memory, electrically erasable programmable read only memory, and the like.

The electrical system 20 as shown schematically in FIG. 1 includes a direct current (DC) power supply 22 such as a multi-cell rechargeable battery pack. The power supply 22 provides a DC input voltage ($V_{DC}$) across positive/high and negative/low voltage bus rails 23H and 23L, respectively. A capacitor 24 providing a capacitor voltage $V_{DC}'$ may be used in electrical parallel with the power supply 22 to regulate transient voltage fluctuations. The power supply 22 may be a relatively high-voltage battery in some embodiments such that the power supply 22 exceeds 12-15 VDC auxiliary voltage levels. Higher voltage levels on the order of 60-300 VDC or more may be used when the electric machine 30 is a traction motor used for propelling the vehicle 10 or for driving another relatively large load. Alternatively, the power supply 22 may be embodied as an auxiliary voltage device or low-voltage device, e.g., when the electric machine 30 is a small servo motor for an appliance or an electronic device.

Further with respect to the power inverter 21, this device includes a plurality of semiconductor switching components labeled individually as S1, S2, S3, S4, S5, and S6. The switching components may be configured as insulated gate bipolar transistors (IGBTs) as shown or other suitable high-speed switching devices. The semiconductor switching components are arranged in separate phase pairs as upper and lower switching components corresponding to connection to the positive/high or negative/low bus rail 23H or 23L, respectively.

For an example three-phase embodiment in which the A, B, and C phases are 120-degrees out of phase with respect to each other, switching pairs may be formed from respective upper and lower switching components S1 and S4 (phase C pair), S3 and S6 (phase B pair), and S5 and S2 (phase A pair). Phase windings 28 of the electric machine 30 are energized by the corresponding phase voltages ($V_A$, $V_B$, or $V_C$) that are output from the power inverter 21. When electrically energized, the electric machine 30 rotates a motor shaft 32 to thereby deliver motor output torque (arrow $T_O$) to a connected load, such as the wheels 12 shown in FIG. 1.

The power inverter 21 is controlled by operation of the controller 50, and specifically according to computer-readable instructions embodying the method 100. The controller 50 may include the PWM modulator 51, which in turn is configured to generate a digital pulse train to modify the reference voltage signal ($V_{REF}$) in the manner set forth herein, with the widths of the individual pulses determined based on an intersection of the carrier wave ($V_T$) and the sinusoidal reference voltage signal ($V_{REF}$) for each voltage phase. The switching components for each phase leg open and close in a complementary fashion. That is, when switching component S1 (upper) is commanded open on a the phase C leg, the other switching component S4 (lower) for the same phase leg is commanded closed, and vice-versa. The phase voltages $V_A$, $V_B$, and $V_C$ are thus varied in an approximately sinusoidal manner between $$-\frac{V_{DC}}{2} \text{ and } +\frac{V_{DC}}{2},$$

with subsequent filtering performed to fine tune the output voltage of the power inverter 21.

A peak or maximum possible value of the sinusoidal reference voltage signals ($V_{REF}$) is less than the peak of a waveform of the carrier wave ($V_T$). When the magnitude of the sinusoidal reference voltage signal ($V_{REF}$) exceeds that of the carrier wave ($V_T$), the upper switching component for the corresponding phase leg is turned on and the lower switching component is turned off, e.g., S1 is turned on and S4 is turned off. Similarly, when the magnitude of the sinusoidal reference voltage signal ($V_{REF}$) is less than that of the carrier wave ($V_T$), the controller 50 turns off the upper switching component and turns on the lower switching component. For instance, for the switching pair (S1, S4) for phase C, the switching component labeled S1 turns on when the reference voltage signal ($V_{REF}$) for voltage phase C exceeds the carrier wave ($V_T$), switching component S4 turns on when the reference voltage ($V_{REF}$) for phase C is less than the carrier wave ($V_T$), and so forth for the phase B and phase A pairs (S3, S6) and (S5, S2), respectively.

Figure 2:
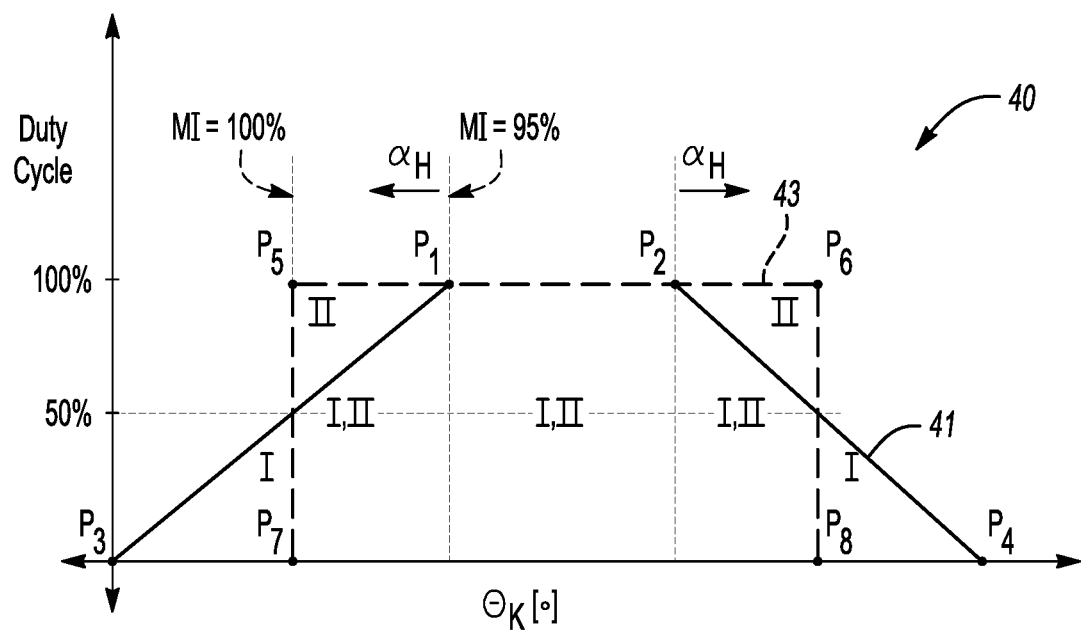
FIG. 2 is a plot of duty cycle (vertical axis) versus voltage angle (horizontal axis) depicting a PWM mode transition according to the present disclosure.

Operation of the method 100 in controlling a mode transition from six-step PWM to over-modulation, or from over-modulation to six-step PWM, will now be explained with reference to FIGS. 2-6D. FIG. 2 depicts a plot 40 of changing duty cycle versus voltage angle when the PWM process is controlled according to the method 100. Duty cycle is depicted as a percentage value (%) on the vertical/Y axis, and voltage angle is depicted in degrees (°) on the horizontal/X-axis and abbreviated $\theta_K$. As used herein, the term "voltage angle" refers to the angular position of the intended output voltage of the power inverter 21, such as the sinusoidal AC output voltage commanded by the PWM controller 50. The reference voltage is converted into corresponding PWM duty cycles via the controller 50, or more specifically by the PWM modulator circuit 51.

Additionally, the term "holding angle" abbreviated $\alpha_H$ herein is also an angular position instructing the PWM modulator circuit 51 precisely where to start increasing or decreasing the duty cycle to produce an AC output voltage whose fundamental voltage corresponds to the reference voltage signal ($V_{REF}$) as commanded by the PWM controller 50. In the event the output voltage from the power inverter 21 becomes greater than an available maximum sinusoidal output voltage, i.e., over-modulation mode in which the power inverter 21 does not produce an instantaneous sinusoidal output voltage, the PWM modulator circuit 51 of FIG. 1 changes the output voltage magnitude and/or the voltage angle so as to create the adjusted PWM duty cycle whose fundamental voltage meets the voltage commanded from the controller 50.

Plot 40 is divided into two regions: a trapezoidal region labeled "I" corresponding to operation in the six-step PWM mode and a rectangular region labeled "II" corresponding to over-modulation. Region I is defined by a perimeter 41 and vertices indicated by points $P_1$, $P_2$, $P_3$, and $P_4$. Rectangular region II is defined by a perimeter 43 and corners $P_5$, $P_6$, $P_7$, and $P_8$. Points $P_1$ and $P_2$ correspond to a modulation index (MI) of 95% at a voltage angle of 60 degrees and 180 degrees, respectively, with the voltage angles 60 and 180 degrees being the initial holding angle ($\alpha_H$) in region I at the onset of over-modulation. Regions indicated by "I, II" correspond to Region I and Region II, and thus do not change during the mode transition addressed herein.

When transitioning to over-modulation mode (Region II), the holding angle ($\alpha_H$) at points $P_1$ and $P_2$ is pushed outward toward points $P_5$ and $P_6$, respectively, as indicated by arrows $\alpha_H$. At 100% modulation index, therefore, Region II is defined by corner points $P_5$, $P_6$, $P_7$, and $P_8$. The respective holding angles ($\alpha_H$) corresponding to points $P_5$ and $P_6$ are 30 degrees and 210 degrees, respectively. In other words, when transitioning from Region I (control via six-step PWM) to Region II (over-modulation) during high-speed operation of the electric machine 30 of FIG. 1, it is desirable to avoid discontinuity. Absent the method 100, such a discontinuity may result prior to the holding angle ($\alpha_H$) reaching 30 degrees and 210 degrees, respectively, with the possible result being overcurrent faults, perceptible transitions in voltage output from the power inverter 21, and/or current ripple. The method 100 thus allows for a continuous uninterrupted transition from Region I to Region II with fewer harmonics and no discontinuity in the output voltage of the power inverter 21.

Figure 3:
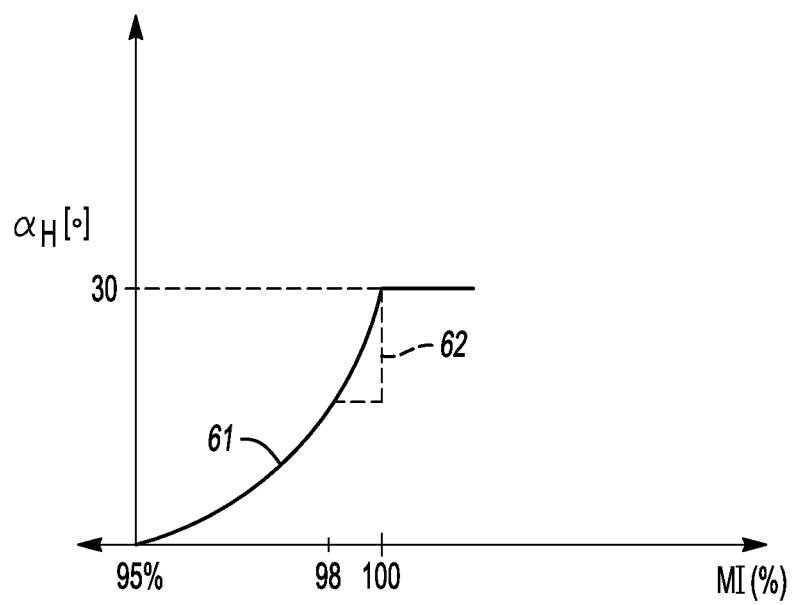
FIG. 3 is a plot of holding angle (vertical axis) versus modulation index (horizontal axis) according to the present method and that of a baseline PWM technique.

The effects of implementing the method 100 are depicted schematically in FIG. 3. Trace 61 illustrates a smooth rising profile and trace 62 illustrates a baseline profile for changes in the holding angle ($\alpha_H$) with respect to increasing modulation index (MI), with the holding angle ($\alpha_H$) depicted in degrees(°) on the vertical/Y-axis and the modulation index (MI) in percent (%) depicted on the horizontal/X-axis. When the modulation index is between 95% and 98%, traces 61 and 62 have a similar rising trajectory and thus overlap. However, beginning at a modulation index of about 98% and continuing to 100%, trace 62 experiences a sudden discontinuity rather than rising smoothly to the indicated holding angle ($\alpha_H$) of 30 degrees. That is, the holding angle remains unchanged as the modulation index rises from 98% to 100%. Using the method 100 results in the continuous trajectory of trace 61, and thus avoids the possible faults or current ripple effects noted above.

Figure 4:
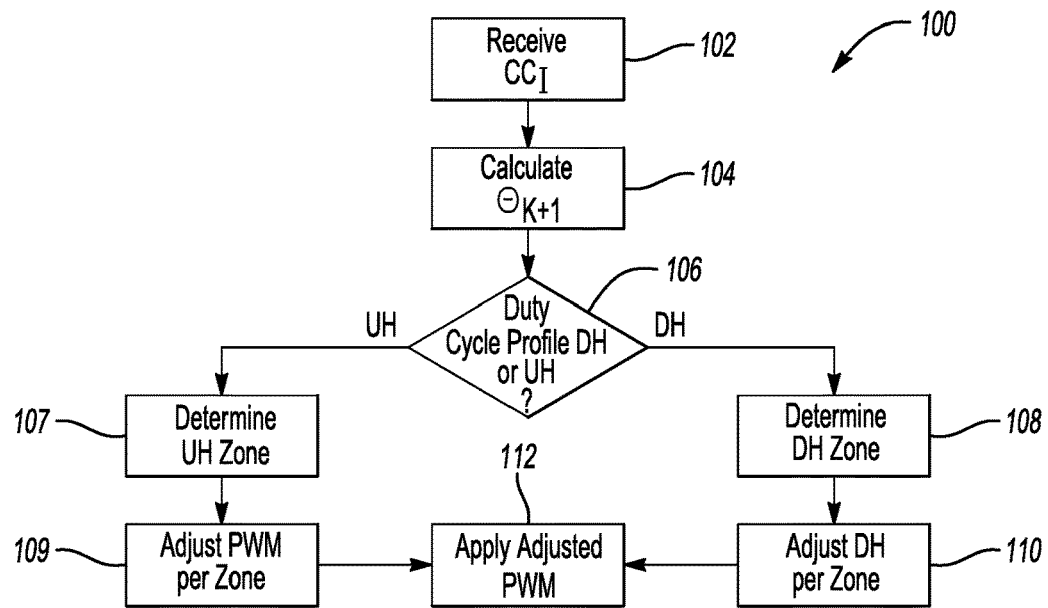
FIG. 4 is a flow chart describing an example method for performing the quasi six-step PWM control technique disclosed herein.

Referring now to FIG. 4, the method 100 according to an example embodiment includes, at block 102, receiving the input values (arrow $CC_I$) via the controller 50 of FIG. 1. The input values (arrow $CC_I$) at block 102 may include reading or otherwise determining the holding angle ($\alpha_H$), the speed ($N_M$), and the present voltage angle ($\theta_K$) of the electric machine 30. For instance, the holding angle ($\alpha_H$), as noted above, is an angular position corresponding to an increase or decrease in duty cycle so as to produce a particular output voltage. Such a value is thus available in logic of the controller 50 in the overall control of the electric machine 30. Likewise, the speed ($N_M$) and voltage angle ($\theta_K$) are available to the PWM controller 50 as measured, calculated, and/or reported values, with the speed ($N_M$) possibly determined in real time using a rotary encoder or resolver (not shown). The method 100 proceeds to block 104 once the input values (arrow $CC_I$) have been received.

At block 104, the PWM controller 50 next calculates a required voltage angle ($\theta_{K+1}$) of the electric machine 30 at a future point in time using the input values ($CC_I$) from block 102 before proceeding to block 106. That is, the PWM controller 50 at block 102 knows the voltage angle ($\theta_K$). Given the speed ($N_M$), the PWM controller 50 can readily determine the voltage angle ($\theta_{K+1}$) at a subsequent point in time, e.g., one sampling loop speed in the future. The method 100 then proceeds to block 106.

Block 106 entails identifying an "uphill" or "downhill" PWM profile using the future voltage angle ($\theta_{K+1}$), i.e., whether the duty cycle is increasing toward 100%/1 (uphill profile) or decreasing toward 0%/0 (downhill profile). Viewing FIG. 2, for instance, an uphill profile is present along perimeter 41 between points $P_1$ and $P_3$, and a downhill profile is present between points $P_2$ and $P_4$. The method 100 proceeds to block 107 when the PWM profile is an uphill profile, and to block 108 in the alternative when the PWM profile is a downhill profile.

Block 107 includes determining an uphill zone of operation on the identified uphill PWM profile (i.e., the duty cycle is increasing). Block 107 may entail determining whether the duty cycle is in an uphill zone of operation in which the duty cycle is 0% at the present voltage angle ($\theta_K$) and rises at ($\theta_{K+1}$) to less than 100% (FIG. 5A), an uphill zone of operation of operation in which the duty cycle is greater than 0% and less than 100% at both ($\theta_K$) and ($\theta_{K+1}$) (FIG. 5B), an uphill zone of operation in which the duty cycle is greater than 0% at the present voltage angle ($\theta_K$) and rises to 100% at ($\theta_{K+1}$) (FIG. 5C), or an uphill zone of operation in which the duty cycle starts out at 0% at ($\theta_K$) and rises to 100% at ($\theta_{K+1}$) (FIG. 5D). The method 100 then proceeds to block 109.

Block 108 includes determining a zone of operation on the identified downhill PWM profile in a block that is analogous to block 107, and then proceeding to block 110. That is, in viewing FIG. 2, the downhill profile of points $P_2$ to $P_4$ starts at 100% duty cycle at $P_2$, then decreases to 0% duty cycle at $P_4$. Thus, corresponding zones of operation to those of block 107 includes a downhill zone of operation in which the duty cycle starts at 100% at the present voltage angle ($\theta_K$) and decreases to more than 0% at ($\theta_{K+1}$), or a zone of operation in which the duty cycle is less than 100% and greater than 0% at both ($\theta_K$) and ($\theta_{K+1}$), or a downhill zone of operation in which the duty cycle is less than 100% at the present voltage angle ($\theta_K$) and decreases to 0% at ($\theta_{K+1}$), or a downhill zone of operation in which the duty cycle starts 100% at ($\theta_K$) and decreases to 0% at ($\theta_{K+1}$). The method 100 then proceeds to block 110.

At block 109 the PWM controller 50 next adjusts a baseline PWM pulse train 70 from the PWM modulator 51 of FIG. 1 based on the determined uphill zone of operation from block 107. The method 100 then proceeds to block 112. Referring to FIG. 5A, for instance, the uphill profile 60 is shown with percentage (%) duty cycle on the vertical/Y-axis and voltage angle in degrees plotted on the horizontal/X-axis. The baseline PWM pulse train 70 represents a calibrated pulse train which the PWM controller 50 will use in the PWM control of the electric machine 30 of FIG. 1 when operating outside of the range of transition from six-step PWM to over-modulation. Block 109 entails adjusting this baseline PWM pulse train 70U, 70D during the transition depending on the zone of operation from prior-described blocks 107 and 108.

Figure 5:
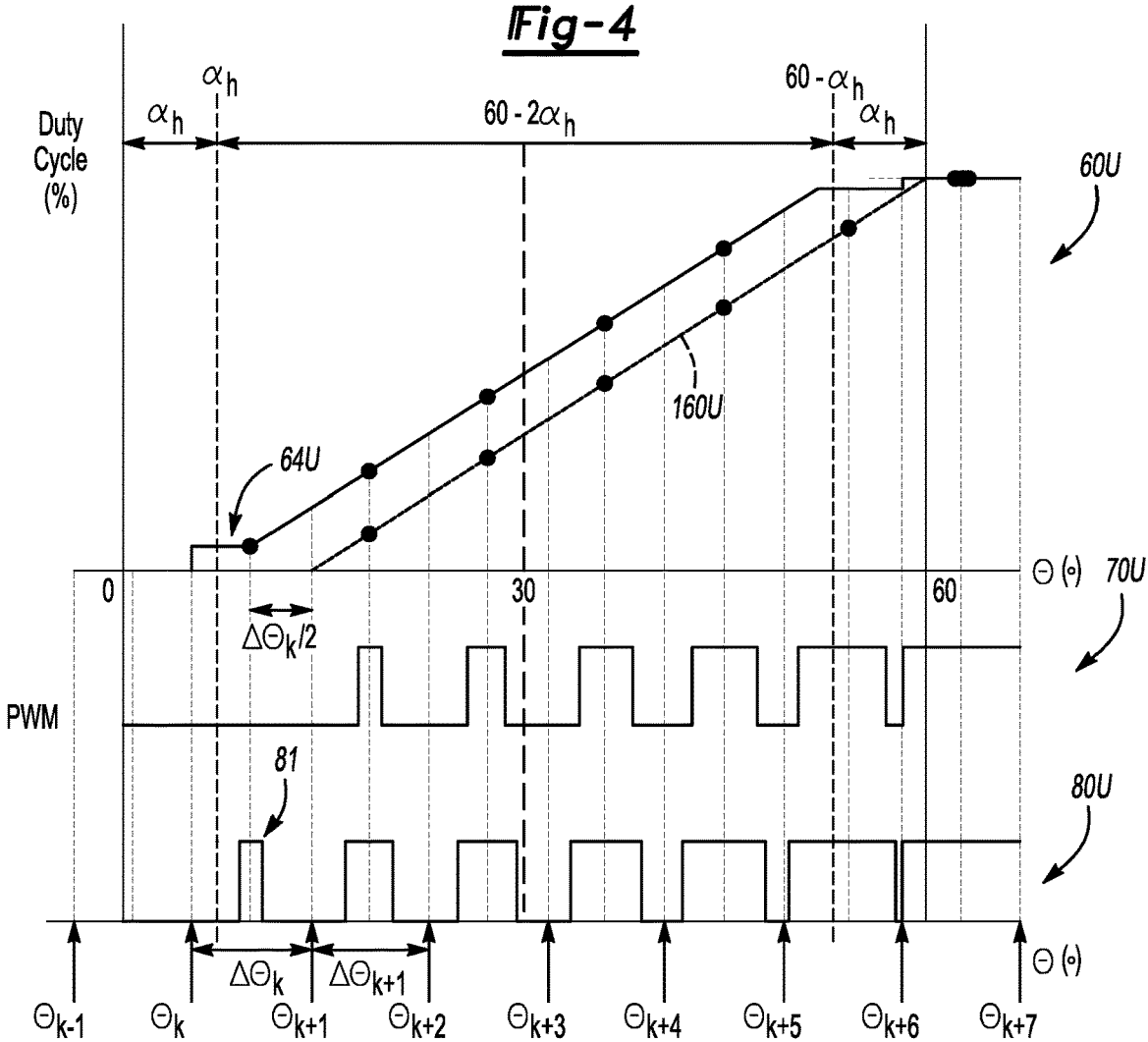
FIG. 5 is a plot of an example uphill PWM profile for the mode transition shown in FIG. 2, along with baseline and quasi six-step PWM pulse trains corresponding to the uphill PWM profile.
Figure 5A:
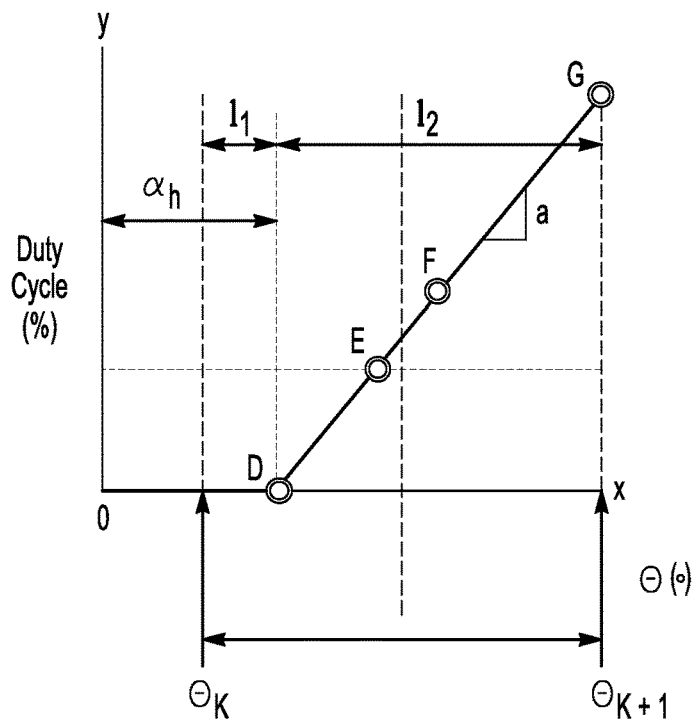
FIGS. 5A-5D are plots of different zones of operation within the uphill PWM profile as used within the method to adjust the baseline PWM pulse train shown in FIG. 5, with duty cycle depicted on the vertical axis and voltage angle depicted on the horizontal axis.

For instance, FIG. 5 depicts an example uphill profile 60U in which duty cycle increases from 0% to 100%. Also shown in FIG. 5 is a baseline PWM profile 70U for achieving six-step PWM absent the present method 100, with its resultant uphill profile 160U rising from 0% duty cycle at a constant rate when the voltage angle is 15 degrees, finally achieving 100% duty cycle and entering over-modulation mode at a voltage angle of 60 degrees.

Also shown for comparison is an adjusted PWM profile 80U in which the baseline PWM profile 70U is adjusted in real time according to the method 100 in order to smooth the transition to over-modulation mode. As can be seen from the baseline and adjusted PWM profiles 70U and 80U, adjustment according to the method 100 results in a PWM pulse 81 midway between $\theta_K$ and $\theta_{K+1}$ that is not present in the baseline PWM profile 70U, with the remaining pulses of the pulse train being progressively wider and closer together than such pulses are in the baseline profile 70U. Such a sequence produces the uphill profile 60U, with an initial step 64 to a threshold low duty cycle followed by a constant ramp in the duty cycle, with the ramp starting at a voltage angle that is $$\frac{\Delta \theta_K}{2}$$

lower than the corresponding voltage angle in the baseline PWM profile 70U. The adjusted uphill profile 60U also reaches 100% duty cycle at a lower voltage angle that is less than the baseline profile 70U by an angle equal to the holding angle ($\alpha_H$).

Referring briefly to FIGS. 5A-D, the adjustment to the baseline PWM profile 70U of FIG. 5 may be performed using a linear algebra operation in a manner that depends on the zone of operation on the uphill PWM profile 60U, as described above with reference to block 107. Thus, with duty cycle depicted on the vertical/Y-axis and voltage angle depicted on the horizontal/X-axis, with holding angle αH and voltage angles $\theta_K$ and $\theta_{K+1}$ known to the controller 50, the duty cycle or y-axis value can be determined along the profile.

That is, for FIG. 5A, point D has $(x_1, y_1)$ coordinates corresponding to the respective voltage angle and duty cycle. Here, $x_1=l_1$, $y_1=0$, and $l_1=(0+\alpha_H)-\theta_K$. For point G at $\theta_{K+1}$ and having the coordinates $(x_2, y_2)$, $y_2=al_2$ and $l_2=\Delta\theta_K-l_1$. The slope $$a = \frac{1}{(60-2\alpha_H)}.$$

For point E, with y coordinate $y_k$, the value of $$y_k = \frac{(y_1 l_1 + y_3 l_2)}{\Delta\theta_K}.$$

Figure 5B:
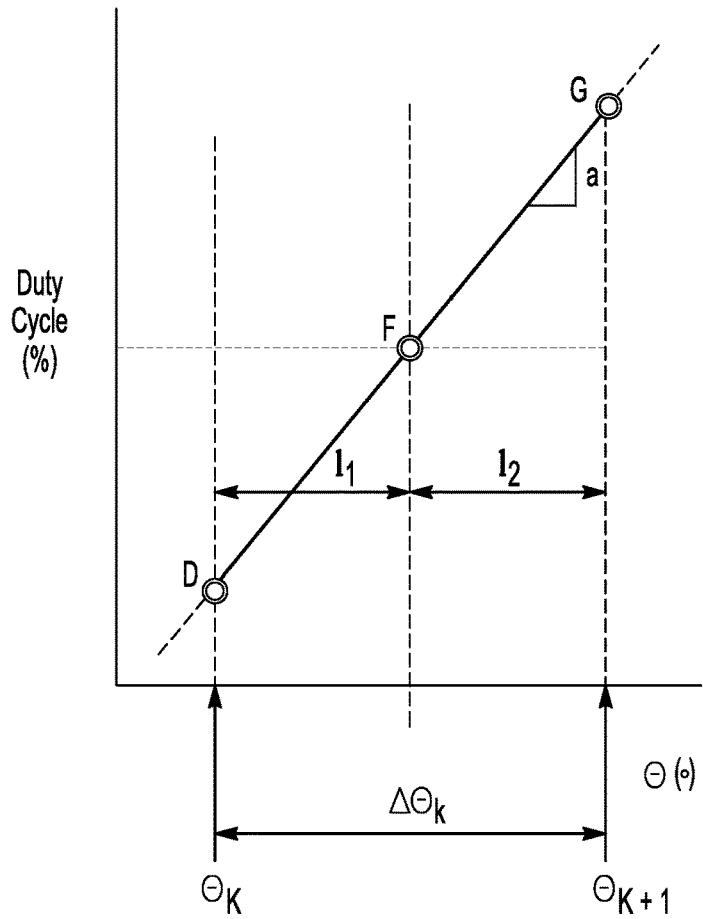

At point F, being halfway to the duty cycle at $\theta_{K+1}$ and point G, $y_3=0.5(y_1+y_2)$. FIG. 5B corresponds to the situation in which duty cycle is rising from a positive percentage to a value less than 100%, and is calculated the same as in FIG. 5A.

Figure 5C:
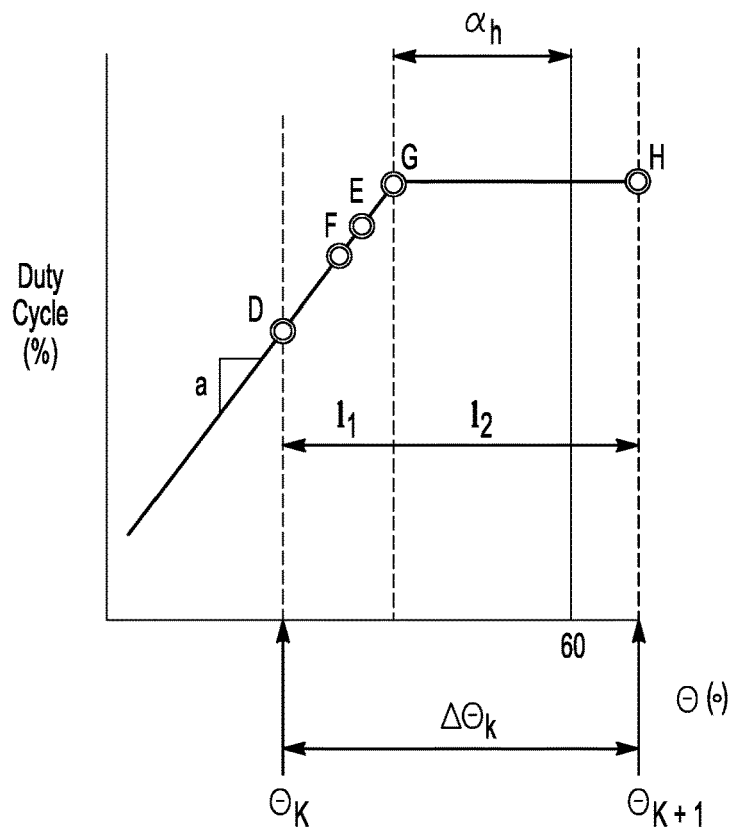
Figure 5D:
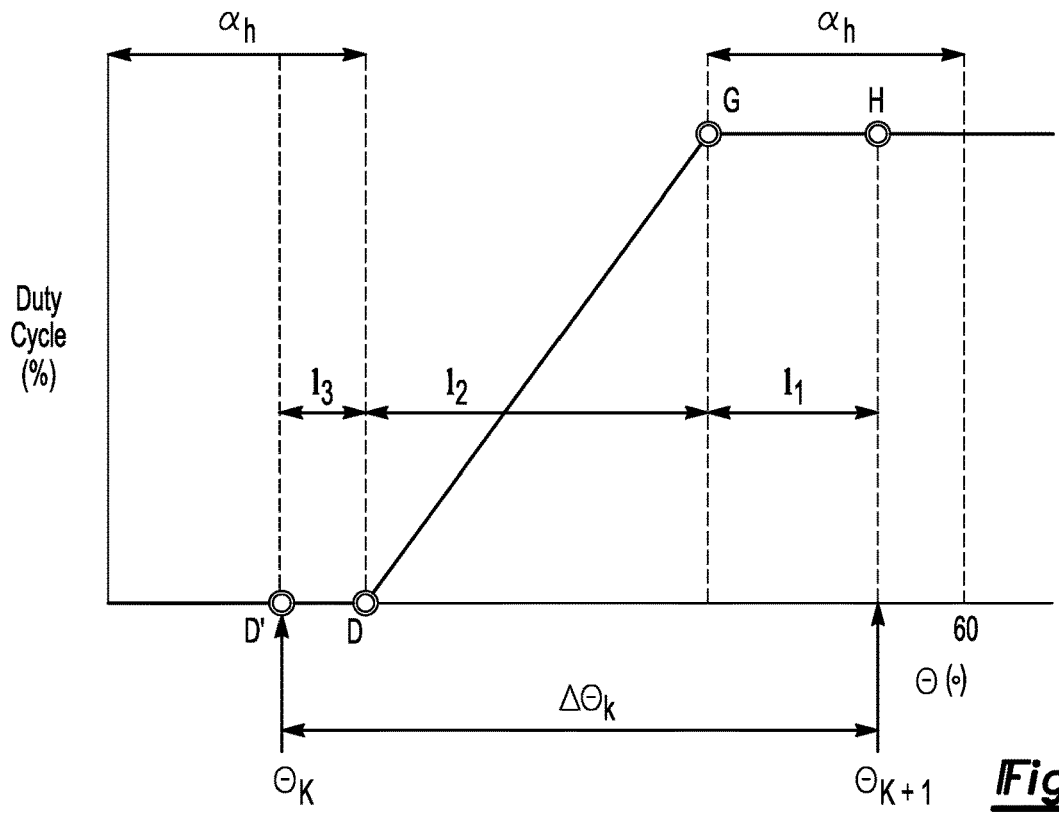

FIG. 5C illustrates increasing the duty cycle from a positive percentage to 100%, and requires a variation to the approach of FIG. 5A. As with FIGS. 5A and 5B, the slope $$a = \frac{1}{(60-2\alpha_H)}.$$

Point D corresponds to coordinates $(x_1, y_1)$ with $x_1=\theta_K-\alpha_H$, and $y_1=a(\theta_K-\alpha_H)$, with $l_1\theta_K+1-(60-\alpha_H)$. For point G at $\theta_{K+1}$ and coordinates $(x_2, y_2)$, the value of $y_2=al_2$ and $l_2=\Delta\theta_K-l_1$. The slope $$a = \frac{1}{(60-2\alpha_H)}.$$

For point E, $$y_k = \frac{(y_1 l_1 + y_3 l_2)}{\Delta\theta_K}$$

with $l_2=\Delta\theta_K-l_1$. For point F, being halfway to the duty cycle at $\theta_{K+1}$ and point G, $x_3=0.5(x_1+x_2)$ and $y_3=0.5(y_1+y_2)$.

FIG. 5D depicts a situation in which duty cycle is 0% at a voltage angle $\theta_K$ rises to 100% duty cycle at $\theta_{K+1}$. Here, $l_3=\alpha_H-\theta_K$, and $l_1=\theta_K+1-(60-\alpha_H)$. The value $l_2=\Delta\theta_K-l_1-l_3$.

Figure 6:
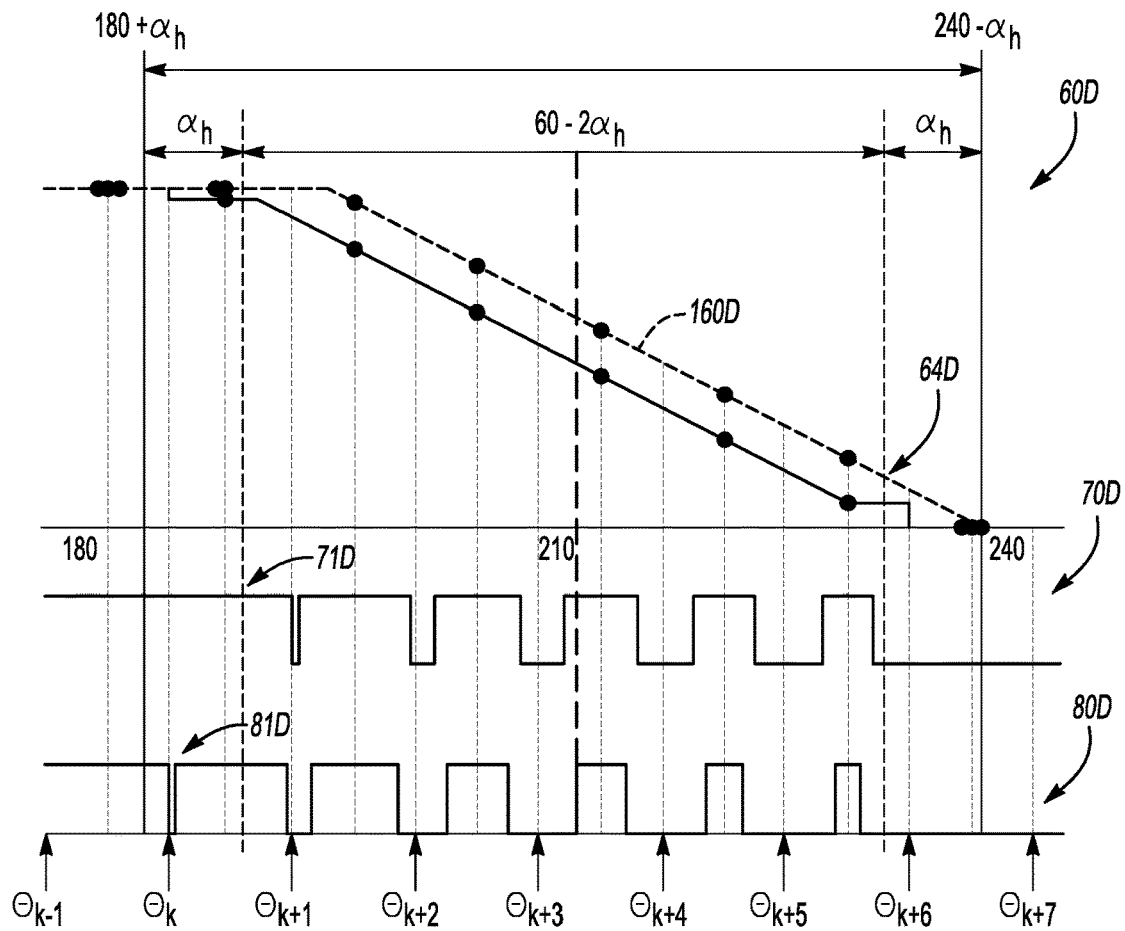
FIG. 6 is a plot of a downhill PWM profile for the mode transition shown in FIG. 2, along with baseline and quasi six-step PWM pulse trains corresponding to the downhill PWM profile.

Referring again to FIG. 4, block 110 includes adjusting a baseline PWM pulse train 70D from the PWM modulator 51 of FIG. 1 based on the determined downhill zone of operation from block 108. FIG. 6 depicts an example downhill profile 60D in which duty cycle decreases from 100% at a voltage angle of about 180 degrees toward 0% and a voltage angle of about 240 degrees. Also shown in FIG. 6 are the baseline PWM profile 70D and a resultant downhill profile 160D ramping down from 100% duty cycle at a constant rate, finally achieving 0% duty cycle. Also shown is an adjusted PWM profile 80D in which the baseline PWM profile 70D is adjusted in real time according to the method 100.

Adjustment according to the method 100 results in a PWM pulse 81D rising shortly after $\theta_K$ and falling at $\theta_{K+1}$. Pulse 81D is not present in the baseline PWM profile 70D, which instead sustains an initial pulse 71D until $\theta_{K+1}$. The remaining pulses are progressively narrower and farther apart than such pulses are in the baseline profile 70D. This sequence produces the downhill profile 60D, with a final step 64D to 0% duty cycle after a constant ramp down in duty cycle. The adjusted downhill profile 60D also reaches 0% duty cycle at a voltage angle that is less than that of the baseline profile 70D by an angle less than the holding angle ($\alpha_H$).

Referring briefly to FIGS. 6A-D, the adjustment to the baseline PWM profile 70D of FIG. 6 may be performed using linear algebra in a manner analogous to that which is described above with reference to FIGS. 5A-D, as described above with reference to block 109. Thus, with duty cycle depicted on the vertical/Y-axis and voltage angle depicted on the horizontal/X-axis, with holding angle $\alpha_H$ and voltage angles $\theta_K$ and $\theta_{K+1}$ known to the controller 50, the duty cycle can be determined along the profile.

Figure 6A:
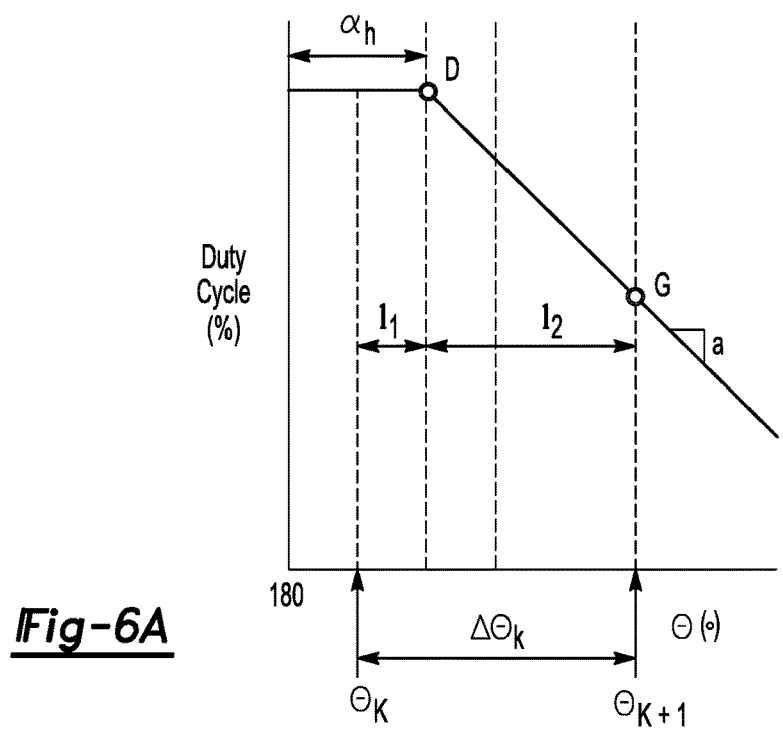
FIGS. 6A-6D are plots of different zones of operation within the downhill PWM profile as used within the method to adjust the baseline PWM pulse train shown in FIG. 6, with duty cycle depicted on the vertical axis and voltage angle depicted on the horizontal axis.

That is, for FIG. 6A, point D corresponds to $(x_1, y_1)$ with $x_1=180+\alpha_H$, and $y_1=1$. The value $l_1=(180+\alpha_H)-\theta_K$, and $l_2=\Delta\theta_K-l_1$. For point G at $\theta_{K+1}$, and with coordinates $(x_2, y_2)$, the value $y_2=1.0-al_2$, and the slope $$a = \frac{1}{(60-2\alpha_H)}.$$

Figure 6B:
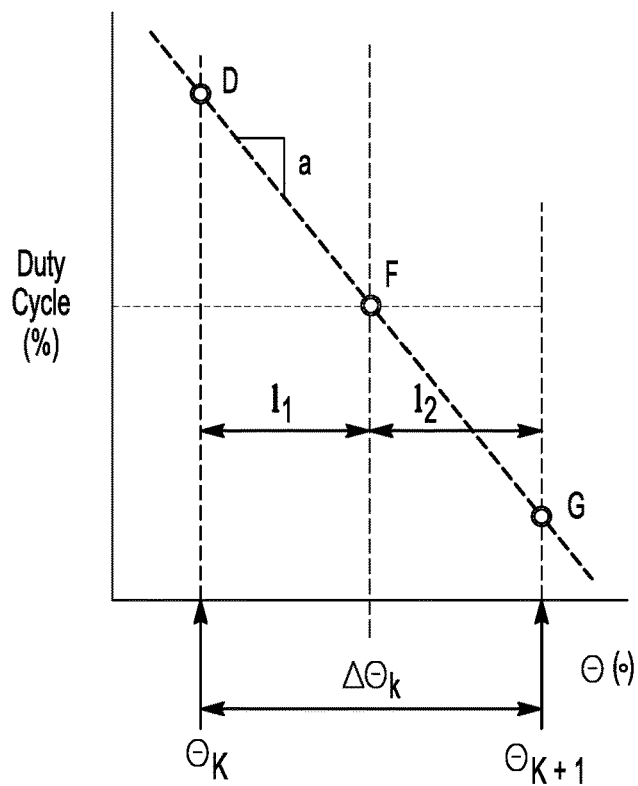

FIG. 6B corresponds to the situation in which duty cycle is decreasing from a positive value less than 100% to a lower positive percentage, and is calculated the same as in FIG. 6A.

Figure 6C:
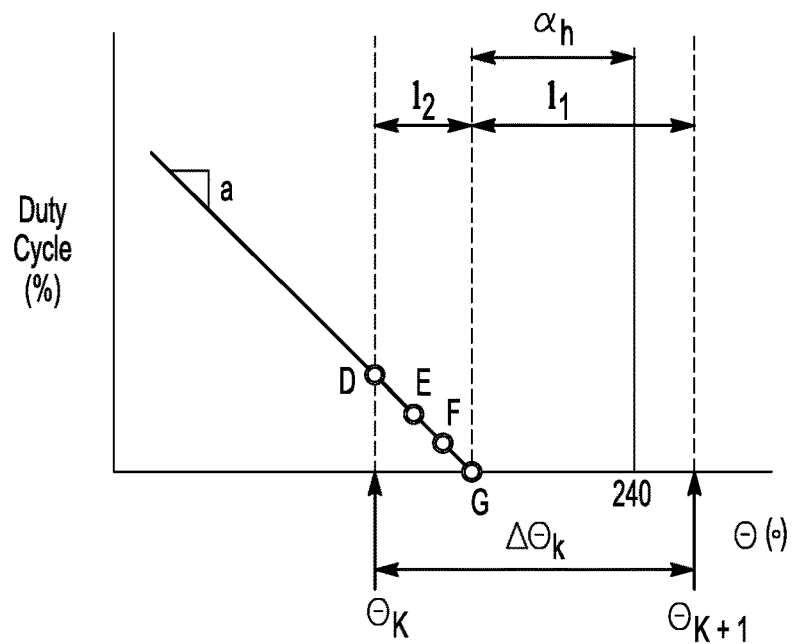

FIG. 6C illustrates decreasing the duty cycle from a positive percentage to 0% duty cycle. Point D has coordinates $(x_1, y_1)$ with $x_1=\theta_K-\alpha_H$, and the value $y_1=a(\theta_K-\alpha_H)$. The value $l_1=\theta_K+1-(60-\alpha_H)$. At point E, which is halfway between points D and G and has coordinates $(x_3, y_3)$, the value $x_3=0.5(x_1+x_2)$ and $y_3=(y_1+y_2)$. At point F, with y coordinate $$y_k = \frac{(y_1 l_1 + y_3 l_2)}{\Delta\theta_K}$$

with $l_2=\Delta\theta_K-l_1$. For point G at $\theta_{K+1}$, and with coordinates $(x_2, y_2)$, the value $x_2=\theta_K$ and $y_2=al_2$. The value $l_2=\Delta\theta_K-l_1$, and the value $l_1=\theta_{K+1}-(240-\alpha_H)$.

Figure 6D:
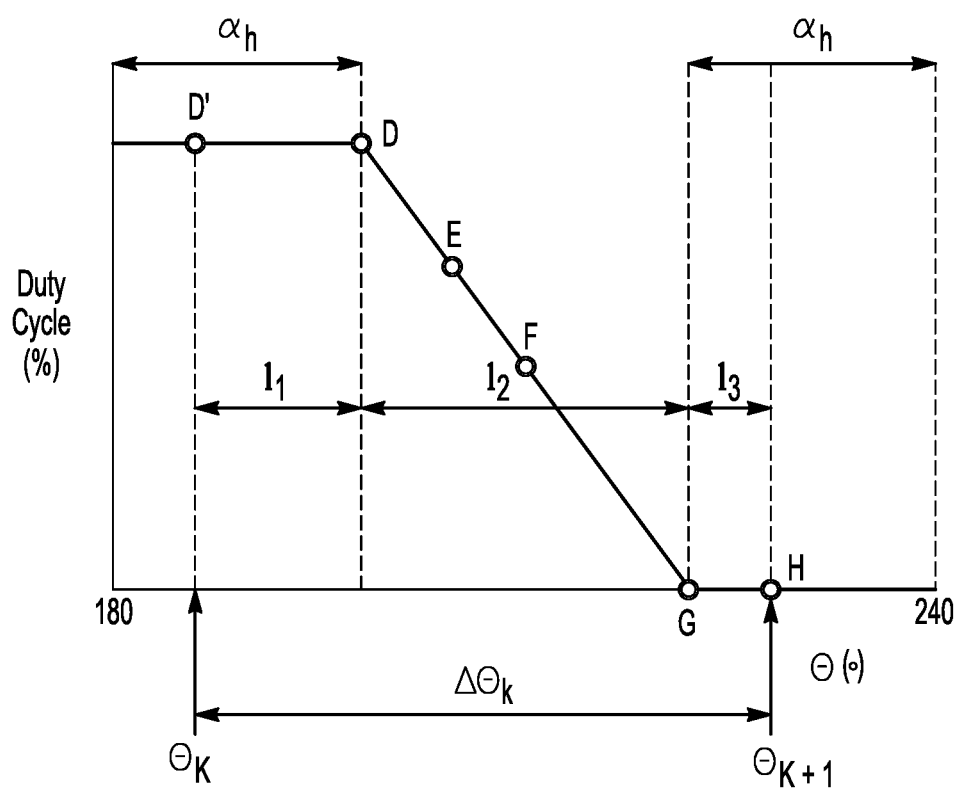

FIG. 6D depicts a situation in which duty cycle is 100% at a voltage angle $\theta K$ decreases to 0% duty cycle at $\theta_{K+1}$. Here, $l_3=\theta_{K+1}-(240-\alpha_H)$, $l_1=(180+\alpha_H)-\theta_K$, and $l_2=\Delta\theta_K-l_1-l_3$.

Referring again to FIG. 4, at block 112 the controller 50 applies the adjusted baseline PWM pulse train from blocks 109 or 110 to thereby deliver the output voltage of the power inverter 21 to the electric machine 30. As a result of block 112, a smooth transition occurs between Regions I and II of FIG. 2. In such a transition, the intended voltage angle starts to deviate from an ideal voltage angle. The method 100 described above thus shapes the duty cycle to the power inverter 21 such that the intended voltage angle matches the ideal, thus optimally smoothing the transition between over-modulation and six-step PWM modes during high-speed operation of the electric machine 30.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method for controlling a transition between an over-modulation mode and a six-step pulse width modulation (PWM) mode in an electrical system having a polyphase electric machine driven by a polyphase output voltage of a power inverter, the method comprising:
   receiving input values via a PWM controller, including a holding angle ($\alpha_H$), a rotational speed ($N_M$) of the electric machine, and a present voltage angle ($\theta_K$) of the power inverter;
   calculating, via the PWM controller, a future voltage angle ($\theta_{K+1}$) of the power inverter using the received input values;
   adjusting pulse widths of a baseline PWM pulse train from the PWM controller based on a duty cycle of the power inverter by identifying whether an uphill PWM profile or a downhill PWM profile is present using the future voltage angle; and
   controlling the output voltage of the power inverter during the transition using the adjusted baseline PWM pulse train such that the transition between the over-modulation mode and the six-step PWM mode is smooth and continuous as the holding angle remains unchanged and a modulation index rises from between 98 percent and 100 percent.

2. The method of claim 1, wherein a curve profile is representative of the holding angle verses the modulation index, and the curve profile includes the transition, and the curve profile is concavely curved as the modulation index rises from 95 percent to 100 percent.

3. The method of claim 1, wherein the electric machine is a three-phase traction motor, and controlling the output voltage of the power inverter includes outputting a three-phase alternating current output voltage from the power inverter to phase windings of the traction motor.

4. The method of claim 3, wherein the traction motor is connected to road wheels of a vehicle, and wherein controlling the output voltage includes powering the road wheels to thereby propel the vehicle.

5. The method of claim 1, wherein adjusting the pulse widths of the baseline PWM pulse train from the PWM controller based on the duty cycle of the power inverter includes:
   wherein the uphill PWM profile corresponds to an increasing duty cycle of the power inverter and the downhill PWM profile corresponds to a decreasing duty cycle of the power inverter;
   determining a zone of operation on the identified uphill or downhill PWM profile as a present operating region of the power inverter; and
   adjusting the pulse widths based on the increasing or decreasing duty cycle.

6. The method of claim 5, wherein determining the zone of operation on the identified uphill PWM profile includes determining whether the duty cycle is:
   0 percent at the present voltage angle and less than 100 percent at the future voltage angle, corresponding to a first uphill zone of operation;
   greater than 0 percent at the present voltage angle and less than 100 percent at the future voltage angle, corresponding to a second uphill zone of operation;
   greater than 0 percent at the present voltage angle and 100 percent at the future voltage angle, corresponding to a third uphill zone of operation; or
   0 percent at the present voltage angle and 100 percent at the future voltage angle, corresponding to a fourth uphill zone of operation.

7. The method of claim 5 wherein determining the zone of operation on the identified downhill PWM profile includes determining whether the duty cycle is:
   100 percent at the present voltage angle and more than 0 percent at the future voltage angle, corresponding to a first downhill zone of operation;
   less than 100 percent at the present voltage angle and greater than 0 percent at the future voltage angle, corresponding to a second downhill zone of operation;
   less than 100 percent at the present voltage angle and 0 percent at the future voltage angle, corresponding to a third downhill zone of operation; or
   100 percent at the present voltage angle and 0 percent at the future voltage angle, corresponding to a fourth downhill zone of operation.

8. The method of claim 1, wherein adjusting the pulse widths of the baseline PWM pulse train includes modifying a baseline PWM pulse train configured for use in the six-step PWM mode.

9. The method of claim 8, wherein modifying the baseline PWM pulse train includes progressively widening and narrowing the pulses of the baseline PWM pulse train between the present voltage angle and the future voltage angle during the uphill and downhill PWM profiles, respectively.

10. The method of claim 9, further comprising, for the uphill PWM profile, introducing an initial step to a low threshold duty cycle upon commencing the uphill PWM profile, and then ramping the duty cycle from a level of the low threshold duty cycle to 100 percent duty cycle.

11. An electrical system comprising:
    a direct current (DC) power supply;
    a power inverter that is electrically connected to the DC power supply;
    a polyphase electric machine that is electrically connected to the power inverter, the electric machine having a rotatable output member; and
    a pulse width modulation (PWM) controller in communication with the power inverter, and configured to:
      receive input values, including a holding angle ($\alpha_H$), a rotational speed ($N_M$) of the electric machine, and a present voltage angle ($\theta_K$) of the power inverter;
      calculate a future voltage angle ($\theta_{K+1}$) of the power inverter using the received input values;

adjust pulse widths of a baseline PWM pulse train from the PWM controller based on a duty cycle of the power inverter by identifying whether an uphill PWM profile or a downhill PWM profile is present by using the future voltage angle; and control an output voltage of the power inverter during a transition using the adjusted baseline PWM pulse train such that the transition is smooth and continuous as the holding angle remains at 30 degrees and a modulation index rises from between 98 percent and 100 percent.

12. The electrical system of claim 11, wherein a curve profile is representative of the holding angle verses the modulation index, and the curve profile includes the transition, and the curve profile is concavely curved as the modulation index rises from 95 percent to 100 percent.

13. The electrical system of claim 11, wherein the electric machine is a three-phase traction motor of a motor vehicle having road wheels that are coupled to and driven by the rotatable output member.

14. The electrical system of claim 11, wherein the uphill and downhill profiles respectively correspond to an increasing and decreasing duty cycle of the power inverter, including:

determining a zone of operation on the identified uphill or downhill PWM profile as a present operating region of the power inverter; and adjusting the pulse widths based on the increasing or decreasing duty cycle.

15. The electrical system of claim 14, wherein the PWM controller is configured to determine the zone of operation on the identified uphill PWM profile by determining whether the duty cycle is:

0 percent at the present voltage angle and less than 100 percent at the future voltage angle, corresponding to a first uphill zone of operation;

greater than 0 percent at the present voltage angle and less than 100 percent at the future voltage angle, corresponding to a second uphill zone of operation;

greater than 0 percent at the present voltage angle and 100 percent at the future voltage angle, corresponding to a third uphill zone of operation; or 0 percent at the present voltage angle and 100 percent at the future voltage angle, corresponding to a fourth uphill zone of operation.

16. The electrical system of claim 14, wherein the PWM controller is configured to determine the zone of operation on the identified downhill PWM profile by determining whether the duty cycle is:

100 percent at the present voltage angle and more than 0 percent at the future voltage angle, corresponding to a first downhill zone of operation;

less than 100 percent at the present voltage angle and greater than 0 percent at the future voltage angle, corresponding to a second downhill zone of operation;

less than 100 percent at the present voltage angle and 0 percent at the future voltage angle, corresponding to a third downhill zone of operation; or 100 percent at the present voltage angle and 0 percent at the future voltage angle, corresponding to a fourth downhill zone of operation.

17. The electrical system of claim 11, wherein the PWM controller is configured to adjust the pulse widths of the baseline PWM pulse train by progressively widening and narrowing the pulses of the baseline PWM pulse train between the present voltage angle and the future voltage angle during the uphill and downhill PWM profiles, respectively.

18. The electrical system of claim 11, wherein for the uphill PWM profile, the PWM controller is configured to introduce an initial step to a low threshold duty cycle upon commencing the uphill PWM profile, and to ramp the duty cycle from a level of the low threshold duty cycle to 100 percent duty cycle.

* * * * *